United States Patent
Hindermann

[11] 3,897,889
[45] Aug. 5, 1975

[54] APPARATUS FOR METERING, BLENDING AND CONVEYING

[76] Inventor: Erich August Hindermann, Am Fischerbreuel 17, D-4034 Angermund, Germany

[22] Filed: Mar. 28, 1974

[21] Appl. No.: 455,857

[30] Foreign Application Priority Data
Apr. 3, 1973 Germany............... 2316558
Oct. 4, 1973 Germany............... 2349826

[52] U.S. Cl. ............ 222/132; 198/64; 222/145; 222/413
[51] Int. Cl.² ................................. B67D 5/60
[58] Field of Search .......... 222/132, 145, 233, 413; 198/64, 107

[56] References Cited
UNITED STATES PATENTS
| | | | |
|---|---|---|---|
| 3,115,276 | 12/1963 | Johanningmeier | 222/132 UX |
| 3,184,112 | 5/1965 | Loeser | 222/413 X |
| 3,227,316 | 1/1966 | Webster | 222/132 X |

Primary Examiner—Richard A. Schacher
Assistant Examiner—Douglas D. Watts
Attorney, Agent, or Firm—Donald D. Jeffery

[57] ABSTRACT

Apparatus for metering, blending and conveying bulk material consisting of two or more flowable constituents, such as plastics granulate in the form of new and regenerated stock to be supplied to an extruder. The apparatus has a partitioned first feed hopper for the bulk material having an outlet fitted with individually sliding gates for controlling discharge of the individual constituents. A screw conveyor is provided having a horizontally extending rigid tubular housing into which the outlet from the first feed hopper discharges. The screw conveyor has a downwardly facing discharge opening at its discharge end. The apparatus also includes a metering device for dye concentrate comprising a second hopper having a vibratable chute connected to it, and a gravity tube for conducting dye concentrate leaving the chute into the screw conveyor. The housing constitutes a support for all the other parts of the apparatus, including the two hoppers, the other parts of the metering device and the screw conveyor drive motor. The housing of the screw conveyor can be mounted directly upon the feed hopper of an extruding machine.

5 Claims, 8 Drawing Figures 3,897,889

APPARATUS FOR METERING, BLENDING AND CONVEYING

BACKGROUND OF THE INVENTION

This invention relates to apparatus for metering, blending and conveying bulk materials consisting of two or more constituents. The apparatus comprises a funnel-shaped container with incorporated partition for receiving the individual bulk material constituents and having an outlet with individually adjustable sliding closure for the separate constituents. The apparatus comprises also a screw conveyor with a tubular housing into which the outlet from the container discharges, and a metering device which consists of a further funnel-like container with a vibrating chute having a variable drive connected to it and with a gravity tube which conducts the material leaving the vibrating chute into the screw conveyor.

A device disclosed in my pending patent application No. 297,766, now abandoned possesses a relatively large funnel-shaped container, which must be supported from a base, for example the ground, by means of feet, and which carries at one side upon a bracket the metering device together with the gravity tube descending therefrom. The screw conveyor is built onto the lower end of the large, funnel-shaped container; this conveyor is therefore suspended from the container and must be of a sufficient length to reach over the inlet opening, for example the inlet funnel of an extruder. For this purpose, it is in general necessary to construct the screw conveyor as a flexible conveyor element which, as described in my patent application No. 297,766 can be bent upwards in order to bring the discharge opening of the screw conveyor to the particular desired discharge point.

For the reasons stated, these known appliances are relatively large and therefore require a floor area which is not always available.

A general object of the present invention is to provide a metering, blending and conveying apparatus, which constitutes one compact structural unit and which can therefore be mounted with minimum space demand directly upon extruders or similar devices, which are supplied from the metering, blending and conveying apparatus, it being possible by means of this apparatus to effect metered introduction of flowable constituents as desired.

SUMMARY OF THE INVENTION

To solve this problem, is is proposed to provide apparatus for metering, blending and conveying bulk material consisting of two or more flowable constituents, said apparatus comprising:

a first funnel-shaped container for receiving individual constituents, said first container having an outlet fitted with individually adjustable sliding gates for controlling discharge of the individual constituents;

a screw conveyor comprising a housing in the form of a generally horizontally extending rigid tube into which the outlet from said container discharges, the screw conveyor possessing at its discharge end a radially downwardly oriented discharge opening; and a metering device comprising a second funnel-shaped container having a variably driven vibratable chute connected thereto and a gravity tube for conducting material leaving the vibratable chute into the screw conveyor;

said housing constituting means for supporting and connecting together all the other parts of the apparatus including said first and second containers and the other parts of said metering device.

The metering, blending and conveying apparatus according to the invention is so constructed that a relatively short housing for the conveyor screw serves as a supporting frame for all the parts of the apparatus including the two funnel-shaped containers, the entire metering device and a drive motor for the screw conveyor. In this manner, a relatively compact small appliance is obtained, which can be mounted for example directly upon the feed hopper of an extruder; it may moreover be mounted at a later date, that is to say the extruder does not need to be especially designed to be fitted with the apparatus according to this invention. In the subject of the present invention, the first funnel-shaped container which holds the basic constituents, for example new plastics granulate and so-called regenerate, which is a granulate made from already used plastics, is of relatively small size and may be supplied continuously from a central silo with the required material, for example by means of a continuous conveyor such as a flexible screw conveyor or a pneumatic conveyor.

According to one preferred from of the invention, the first container, equipped with a partition, possesses near to its lower end an opening into which the vibratable chute penetrates, the discharge end of this vibratable chute lying above a feed hopper of a pipe such as a gravity pipe leading into the housing of the screw conveyor. In such a case, the vibratable chute preferably projects through the opening of the first container and terminates above a gravity tube located behind the opening and leading into the screw conveyor. The second container, provided for the feed of concentrated dye, is thus secured at the discharge end of the screw conveyor on its housing, whereas the first container is mounted on the supply end of the screw conveyor. The gravity tube for the introduction of concentrated dye, leading into the screw conveyor, is however situated either inside the first container or upon that side of the first container intended for the concentrated dye.

In this case, the vibratable chute projects through the opening provided in the lower end of the first container, in order to extend as far as the gravity tube. This arrangement makes possible an especially compact form of construction of the entire appliance, which can therefore be supplied as one easily managed unit and can be mounted in a simple way at the desired position, for example on the feed hopper of an extruder.

The apparatus of my above mentioned patent application is designed for two flowable substances intended to be supplied in a variable blending ratio to a consuming point, for example plastics granulate and a third constituent having a colouring effect. Since certain materials necessitate, as colouring constituents or other additives; substances which do not flow and cannot be poured but which are liquid or pasty, the apparatus of my earlier patent application is not suitable in all cases. Therefore according to a preferred feature of the invention, the metering device is equipped with a metering pump for liquid.

This metering pump is preferably a regulatable pump, by means of which the metered introduction of very small quantities of liquid can be effected. In this way it is possible, for example, to add colouring material in very small bit accurately metered quantities in liquid or pasty form, whereby once again an absolutely uniform blending with the other constituents is effected, before the blended material reaches the discharge position of the apparatus. It is of course possible to effect the metered introduction of liquids or pastes other than liquid or pasty dyes.

For example, the pressure line of the metering pump may lead into a feed hopper leading into the housing of the screw conveyor. In this way it is possible, either to introduce this pressure line optionally into the feed hopper, or to feed in other constituents, for example flowable or pulverulent constituents, through the feed hopper, by means of another metering device.

According to another preferred feature of the invention, the pressure line of the metering pump is directly connected to the housing of the screw conveyor, that is to say there is a permanent connection between the metering pump and the housing of the screw conveyor. In such cases, a feed hopper is under certain circumstances completely superfluous or the feed hopper is permanently available for the feeding of other constituents.

According to another preferred feature of the invention, the metering device possesses both a metering pump and a metering device intended for the introduction of flowable substances, the use of these devices being optional. Thus a universally applicable apparatus is obtained, by means of which either liquid or dry additional constituents can be metered and introduced. An appliance of this type is suitable when it is necessary to carry out widely differing metering programs using one and the same apparatus.

For example, the metering pump and the metering device may be mounted together upon a pivotal plate, and swung as desired into their appropriate operating positions. In this way, it is possible in a simple manner to convert the apparatus, when for example a change is to be made from a liquid to a dry constituent. If however, the operations are always to be carried out using the same program, then such a convertible device is in general not required.

Using apparatus according to the invention, it is also possible to supply the desired blend of material and in particular raw material of the desired colouration without any difficulty to extruders which are pneumatically fed, because the blending of new material and regenerate and the introduction of dye does not take place until the materials arrive at the extruder. It is when pneumatic supply of the new material and regenerate is used, that an accurately metered blending of dye would not be possible, if the material were already blended in a silo or at some other central point, because segregation very easily takes place in the pneumatic conveyor.

BRIEF DESCRIPTION OF THE DRAWINGS

Embodiments of the invention will now be described by way of example, with reference to the accompanying drawings in which.

DESCRIPTION OF PREFERRED EMBODIMENTS

Figure 1:
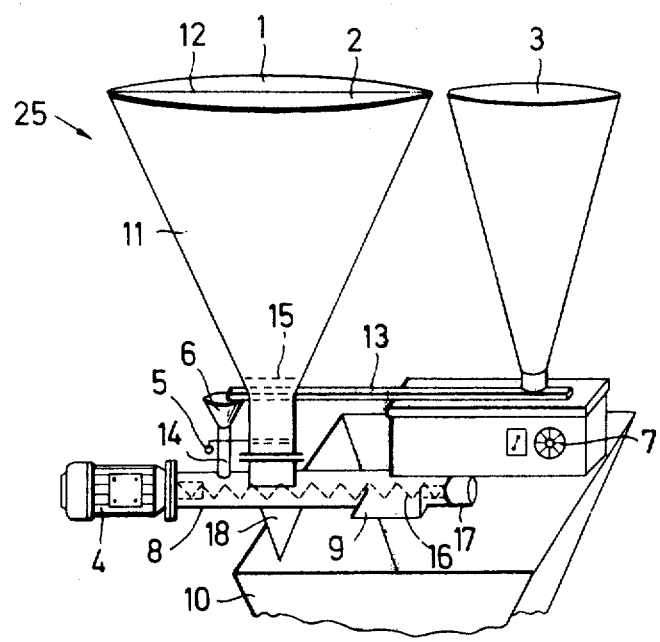
FIG. 1 is an outline view of apparatus according to one embodiment of the invention.

The apparatus according to FIG. 1 possesses a feed hopper 11 intended for the introduction of material, which is sub-divided by a partition 12 into two compartments 1 and 2, for the feed of new material and regenerate respectively. In addition, the device is also equipped with a further hopper 3, of smaller volume than the hopper 11 and serving for the feed of dyed concentrate. The hopper 3 is mounted upon a variable vibration drive 7, housed in a box, from which a vibrating chute 13 leads to a feed hopper 6 of a vertically and downwardly extending gravity tube 14. The vibrating chute 13 passes through an opening 15 in the lower end of the hopper 11 and supplies dyed concentrate from the hopper 3 in metered quantities to the feed hopper 6 and thus into the gravity tube 14.

The hopper 11 leads vertically to a tubular, rigid housing 8, containing a screw conveyor 16 which can be driven by a motor 4. In this embodiment, the two branches of the discharge opening from the hopper 11 which are separated from each other by the opening 15 are each equipped with a sliding gate 5, only one of these sliding gates being illustrated in the drawing. The two sliding gates can be separately adjusted, so that in this way the blending ratio between the new material supplied from compartment 1 and regenerate supplied from compartment 2 can be varied as desired.

The motor 4 is directly flange-bolted onto the left-hand end of the housing 8 as shown in FIG. 1. At this left end, which constitutes the feed end for the screw conveyor 16, the gravity tube 14 and the hopper 11 are also mounted upon the housing 8. The opposite end of the housing 8 is closed by a head-piece 17, in which the end of the screw conveyor 16 remote from the drive motor 4 is journalled. Just upstream of this end of the housing 8, a downwardly oriented material discharge opening 9 is provided. The box containing the drive 7 together with the vibration chute 13 mounted thereon and the hopper 3 is also mounted upon this end of the tubular housing 8, so that the housing 8 holds together all the components of the apparatus according to the invention.

It can be seen from FIG. 1 that the device is mounted seated upon a hopper 10 by means of a bracket 18, it being possible for the bracket 18 to be welded into the hopper 10 or to be suspended on the hopper or clamped thereto.

The hopper 10 can be the feed hopper of an extruder, not shown in detail.

Figure 2:
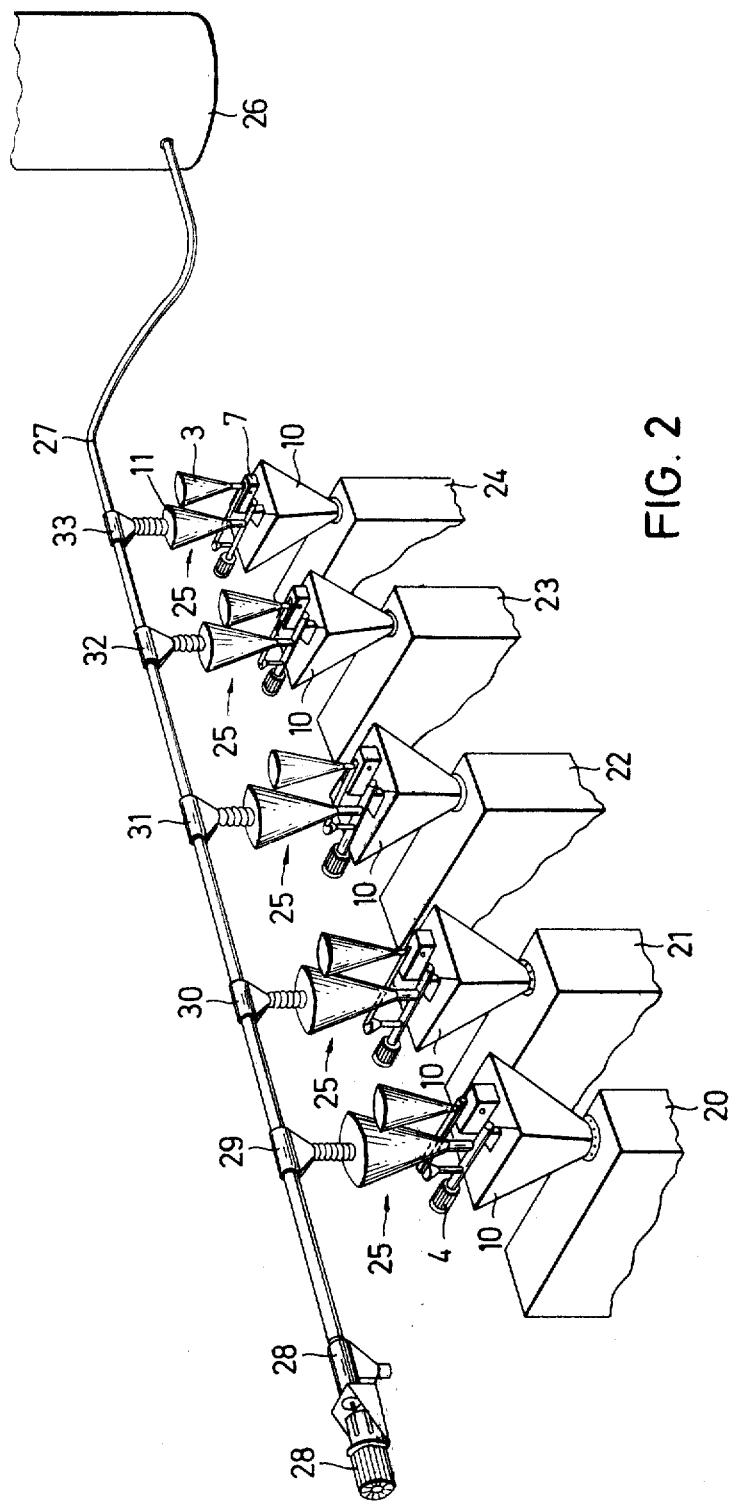
FIG. 2 is an illustration from which the lay-out of individual apparatus according to the invention upon a number of extruders can be recognised, it being possible for all these extruders to be supplied continuously from a central silo with new material and optionally also with regenerate.

In FIG. 2, a total of five extruders, 20–24, are shown diagrammatically alongside one another, each being equipped with a feed hopper 10. An apparatus 25 according to the invention, of the kind illustrated in FIG. 1, is mounted upon each feed hopper 10. All these apparatus are supplied with new material and/or regenerate from a silo 26, through a flexible screw conveyor 27 possessing a single drive motor 38. For this purpose, the screw conveyor 27 is provided with a number of discharge heads 28–33, the discharge head 28 being out of use in the example illustrated.

Instead of the flexible screw conveyor 27, a pneumatic conveyor device could also be used for supplying the material to the separate appliances 25.

The apparatus according to the invention is capable of supplying any plastics processing machine with dyes as required, independently of the raw granulate or natural granulate supplied in each case. The possibilities of use are numerous.

Thus for example as shown in FIG. 2, all the machines may be supplied from a central silo with natural granulates, whereas each apparatus 25 may be individually adjusted for a different colour or for a different blend of colours, as desired. The apparatus according to the invention is especially suitable also for pneumatic conveyor plants which are already installed, in which because of the risk of segregation, the introduction of dye must be carried out directly upon the plastics processing machine. Apart from its very simple and therefore economic form of construction, the apparatus is also characterised by simple handling and low operating costs.

The apparatus according to the invention can also be mounted directly upon the material feed container for plastics processing machines such as extruders; it requires only a single drive motor 4 of relatively low power, for example only 0.3 H.P. for the feed of material and the metered feed of blended colours.

The apparatus according to the invention illustrated in FIGS. 3 to 8 may also be utilised in the manner shown in FIG. 2.

Figure 3:
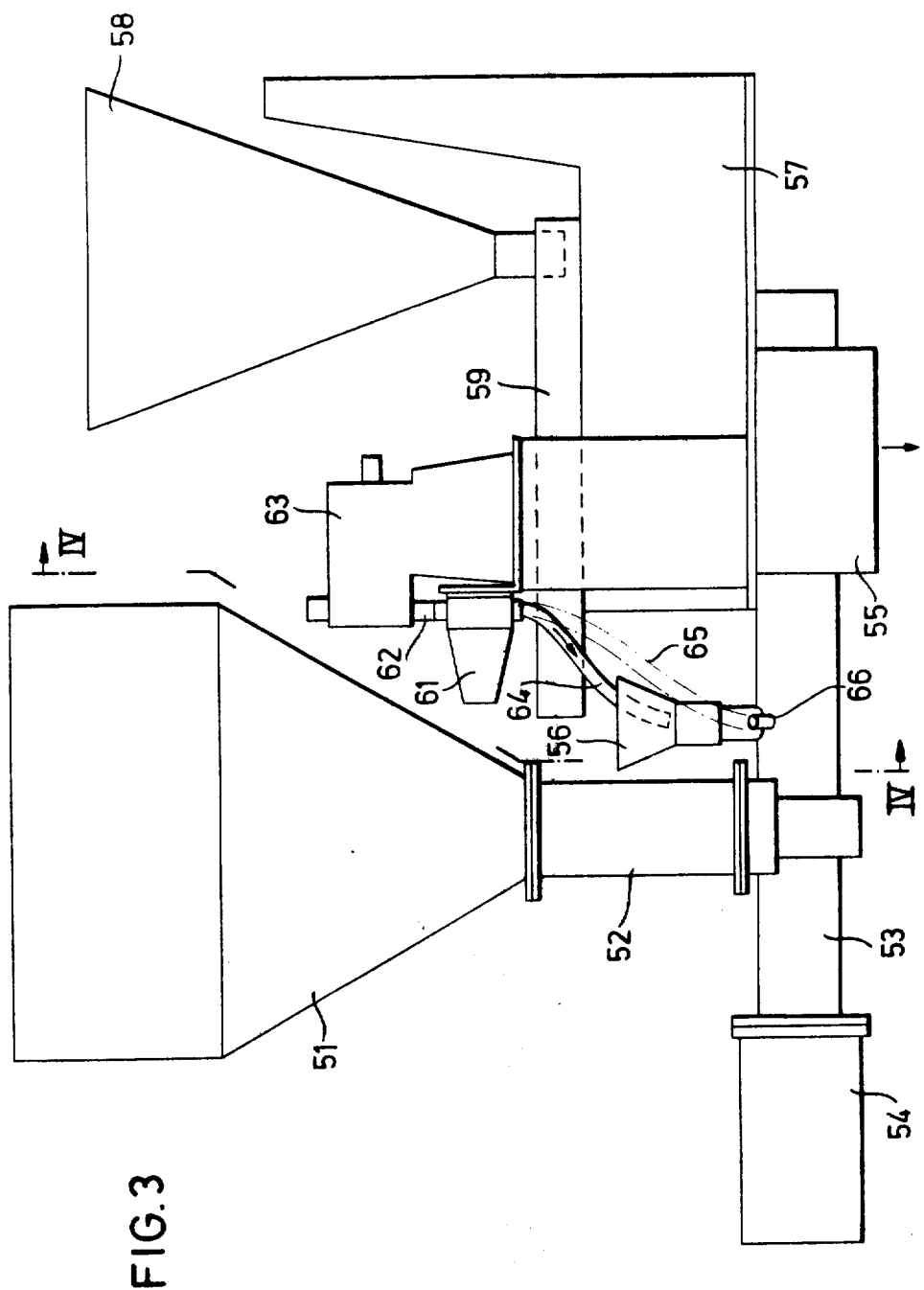
FIG. 3 is a side-view of apparatus according to a second embodiment of the invention, with a metering pump mounted in a fixed position.
Figure 4:
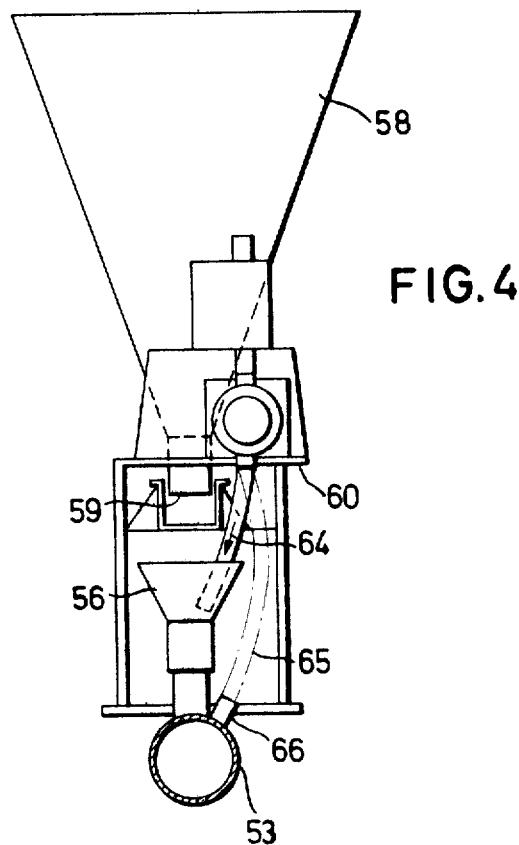
FIG. 4 is a vertical section along IV—IV of FIG. 3.
Figure 5:
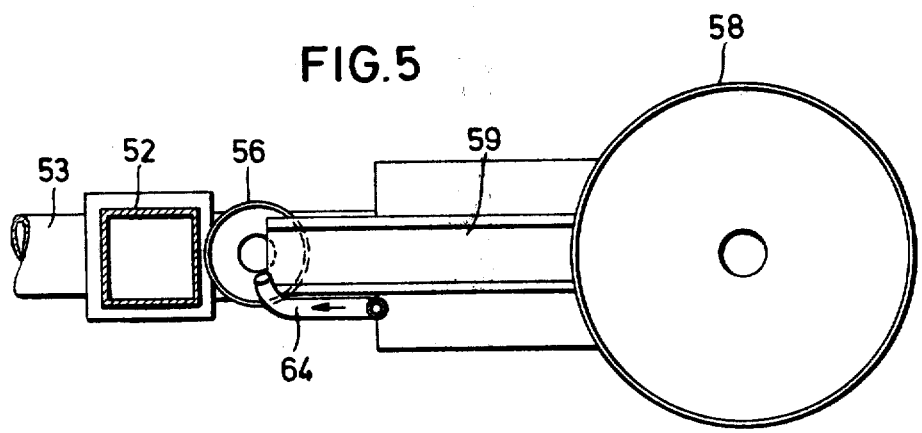
FIG. 5 is a plan upon the part of the apparatus according to FIGS. 3 and 4 which comprises the feed hopper.

The apparatus shown in FIGS. 3 to 5 possesses a hopper 51 intended for the feed of stock such as plastics granulate, this feed hopper discharging through a vertical shaft 52, possessing a sliding gate not shown, into a tubular rigid housing 53 of a screw conveyor. The shaft 52 is mounted upon the housing 53.

A drive motor 54 is flange-bolted onto one end of the housing 53; this motor drives the screw conveyor, contained in the housing but not shown in the drawing. At the opposite end of the housing 53, a downwardly oriented material outlet 55 is provided.

On the housing 53, a feed hopper 56 is also mounted, through which a further component can be introduced in metered quantities into the housing 53. Finally, on the upper side of the housing 53, a further metering device 57 is mounted, which will be described below in more detail.

The metering device 57 comprises a hopper 58, which can contain flowable or pourable material. The lower end of the hopper 58 opens into a vibrating chute 59, the free discharge end of which is situated above the feed hopper 56, so that the stock from the hopper 58 can be introduced in metered quantities through the feed hopper 56 into the housing 53, when the vibrating chute 59 is in operation.

Above the vibrating chute 59, a metering pump 61 is mounted upon a bracket 60; the suction line 62 of this pump is connected to a storage vessel 63 for a liquid metered substance. The delivery side of the metering pump 61 is connected to a hose, either a hose 64 hanging down into the feed hopper 56, or a hose 65 which is coupled onto a tubular inlet 66 of the housing 53 and thus constitutes a closed connection to this housing 53.

Using the metering pump 61 it is possible, at will, to effect the metered introduction of liquid constituents, this metered supply being effected either in place of the metering of granular material through the vibration chute 59, or additionally thereto.

Figure 6:
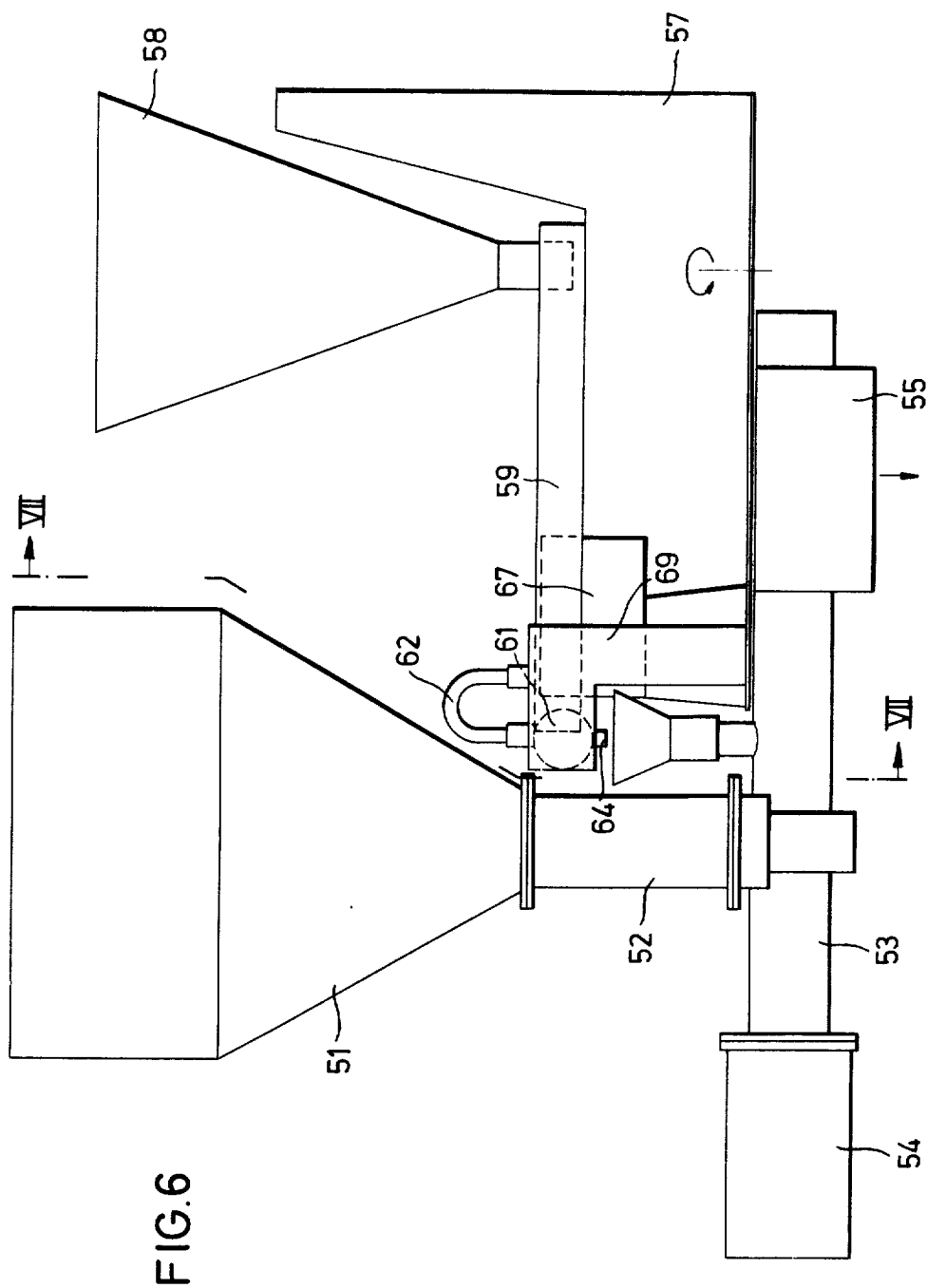
FIG. 6 is a side-view of apparatus, different from FIGS. 3 to 5, according to a third embodiment of the invention having a pivotally mounted metering pump.
Figure 7:
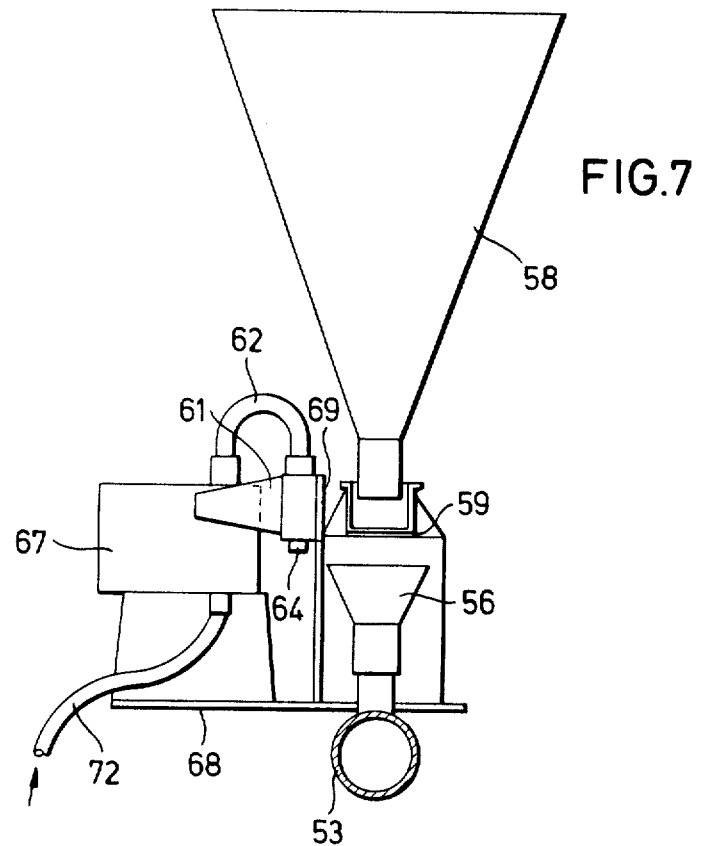
FIG. 7 is a vertical section along the line V—V of FIG. 6.
Figure 8:
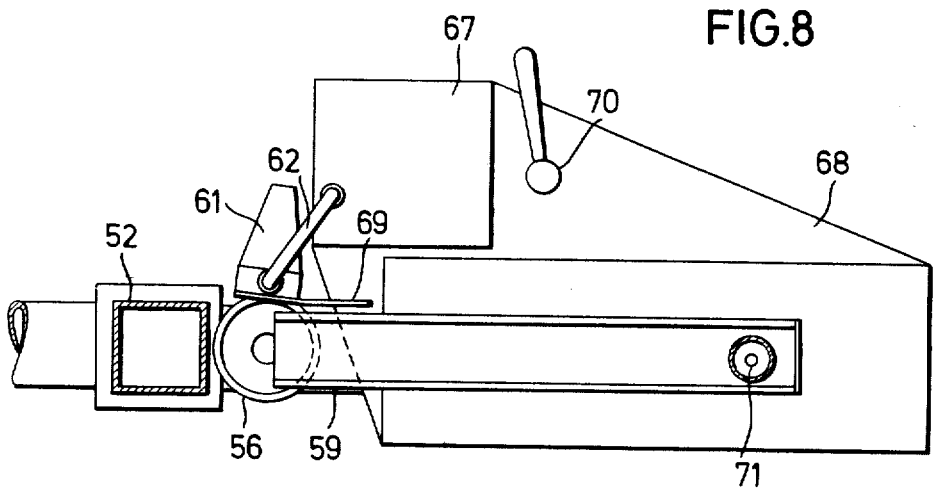
FIG. 8 is a plan on the device according to FIG. 6, some parts being omitted for the sake of clarity.

The apparatus according to FIGS. 6 to 8 differs from that shown in FIGS. 3 to 5 essentially in that the vibrating chute 59 and the metering pump 61 are arranged so as to be pivotal. Here, a liquid storage container 67 is mounted alongside the vibrating chute 59 on a plate 68, upon which the metering pump 61 is mounted by means of a support plate 69. The plate 68 is equipped with a locking device 70 and is pivotally journalled about a rotational centre 71, so that the metering pump 61 can either be swung outwards into the position illustrated in FIG. 7 or can be swung in, into the operating position shown in FIG. 6. Since the vibrating chute 59 is attached, together with the hopper 58, to the plate 68, either the metering pump 61 or the vibrating chute 59 will therefore be situated above the feed hopper 56, so that either liquid or dry material may be metered through the feed hopper 56 into the housing 53. By using the locking device 70, the plate 68 can be secured in either one or the other operating position.

A flexible hose 72 leads into the storage container 67; liquid can be introduced through this hose from a supply container, not shown.

It is also possible so to arrange the pump 61 and the vibrating chute 59, that their outlet opening 64 and discharge end, respectively, are always situated above the feed hopper 56, so that a pivotal mounting of these components is not necessary. In such a case it is only necessary to ensure that the outlet opening 64 of the pump 61 is situated, in the vicinity of the feed hopper, not above the discharge end of the vibrating chute 59, but in fact alongside this discharge end.

Finally, it is also possible to incorporate the storage container for the liquid to be metered and supplied, in a manner not shown into the hopper itself, the hose connection 72 then being connected to this storage container.

I claim:

1. Apparatus for metering, blending and conveying bulk material consisting of two or more flowable constituents, said apparatus comprising:

a first funnel-shaped container for receiving individual constituents, said first container having a vertical partition, an opening near its lower end and an outlet fitted with individually adjustable sliding gates for controlling discharge of the individual constituents;

a screw conveyor comprising a housing in the form of a generally horizontally extending rigid tube into which the outlet from said container discharges, the screw conveyor possessing at its discharge end a radially downwardly oriented discharge opening; and a metering device comprising a second funnel-shaped container having a variably driven vibratable chute connected thereto and a gravity tube for conducting material leaving the vibratable chute into the screw conveyor, said chute penetrating said opening in said first container, said housing constituting means for supporting and connecting together all the other parts of the apparatus including said first and second containers and the other parts of said metering device.

2. Apparatus as claimed in claim 1, wherein the vibratable chute extends through the opening and terminates above a gravity tube situated behind the opening and leading into the screw conveyor.

3. Apparatus for metering, blending and conveying bulk material consisting of two or more flowable constituents, said apparatus comprising:

a first funnel-shaped container for receiving individual constituents, said first container having an outlet fitted with individually adjustable sliding gates for controlling discharge of the individual constituents;

a screw conveyor comprising a housing in the form of a generally horizontally extending rigid tube into which the outlet from said container discharges, the screw conveyor possessing at its discharge end a radially downwardly oriented discharge opening; and a metering device comprising a second funnel-shaped container having a variably driven vibratable chute connected thereto and a gravity tube for conducting material leaving the vibratable chute into the screw conveyor and also comprising a metering pump for discharging liquid to said screw conveyor;

said metering device and said metering pump being mounted together upon a pivotal plate to be swung as desired into their appropriate operative positions to bring them optionally into use;

said housing constituting means for supporting and connecting together all the other parts of the apparatus including said first and second containers and said metering device.

4. Apparatus as claimed in claim 3, wherein a delivery line from the metering pump is connected directly to the housing of the screw conveyor.

5. Apparatus as claimed in claim 3, wherein a delivery line from the metering pump discharges into a feed hopper leading into the housing of the screw conveyor.

* * * * *